E. SCHNEIDER.
COMBINED APPARATUS COMPRISING A RECOIL BRAKE, A RECUPERATOR, AND A RUNNING OUT MODERATOR FOR GUNS.
APPLICATION FILED SEPT. 10, 1918.

1,333,280.

Patented Mar. 9, 1920.

E. SCHNEIDER.
COMBINED APPARATUS COMPRISING A RECOIL BRAKE, A RECUPERATOR, AND A RUNNING OUT MODERATOR FOR GUNS.
APPLICATION FILED SEPT. 10, 1918.
1,333,280.
Patented Mar. 9, 1920.
7 SHEETS—SHEET 2.
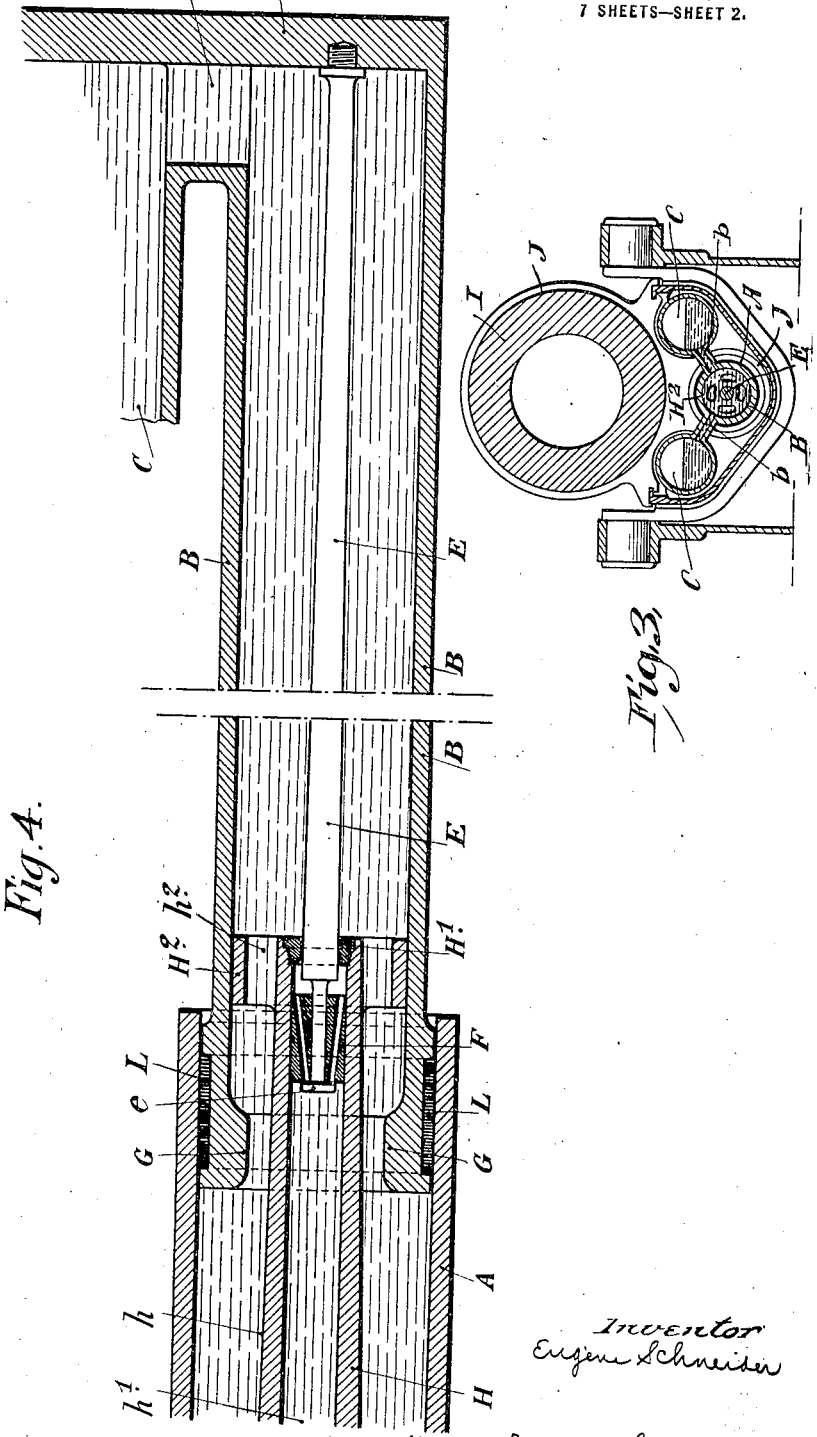

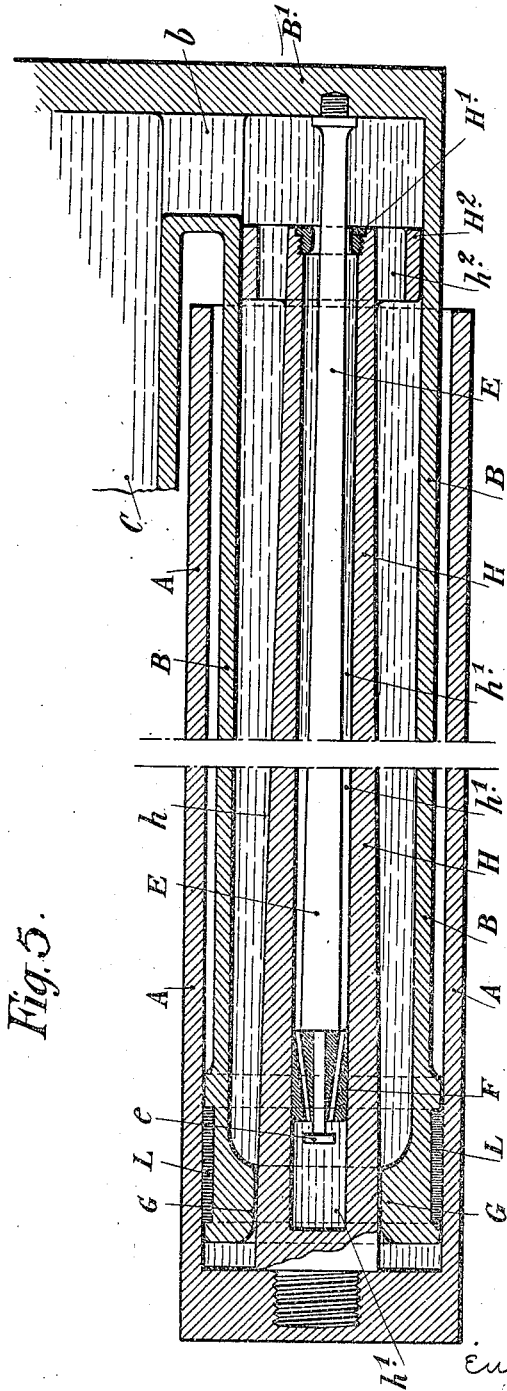

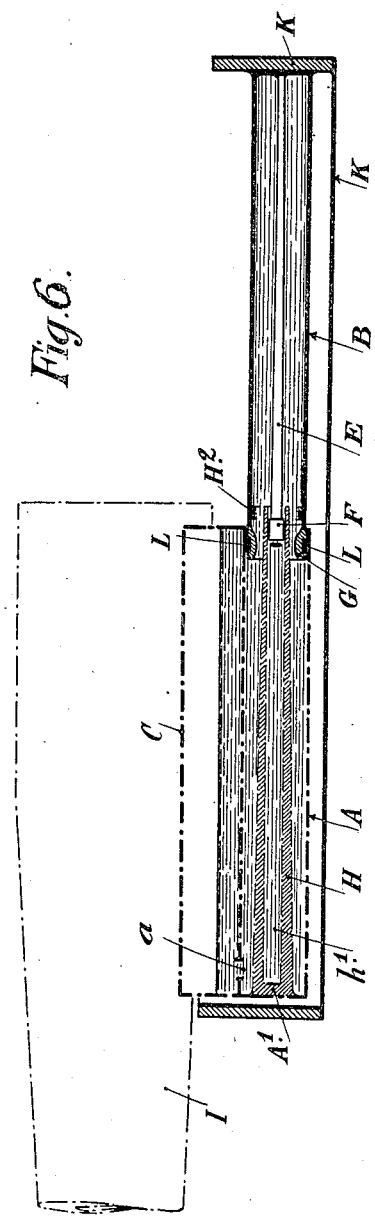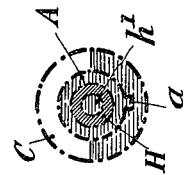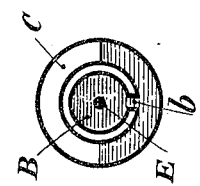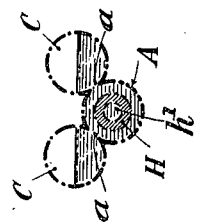

E. SCHNEIDER.
COMBINED APPARATUS COMPRISING A RECOIL BRAKE, A RECUPERATOR, AND A RUNNING OUT MODERATOR FOR GUNS.
APPLICATION FILED SEPT. 10, 1918.

1,333,280.

Patented Mar. 9, 1920.
7 SHEETS—SHEET 5.

Inventor
Eugene Schneider,
by Mauro, Cameron, Lewis, Massie,
Attorneys.

E. SCHNEIDER.
COMBINED APPARATUS COMPRISING A RECOIL BRAKE, A RECUPERATOR, AND A RUNNING OUT MODERATOR FOR GUNS.
APPLICATION FILED SEPT. 10, 1918.
1,333,280.
Patented Mar. 9, 1920.
7 SHEETS—SHEET 6.
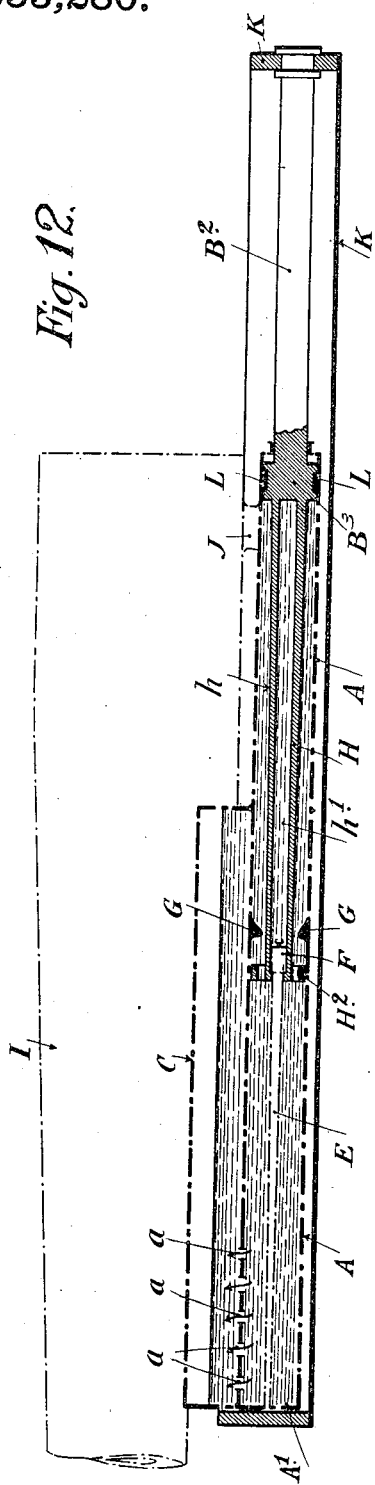
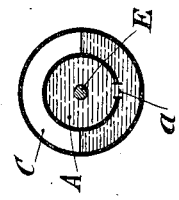
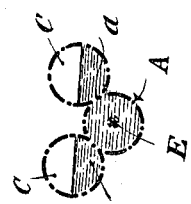

E. SCHNEIDER.
COMBINED APPARATUS COMPRISING A RECOIL BRAKE, A RECUPERATOR, AND A RUNNING OUT MODERATOR FOR GUNS.
APPLICATION FILED SEPT. 10, 1918.
1,333,280.
Patented Mar. 9, 1920.
7 SHEETS—SHEET 7.
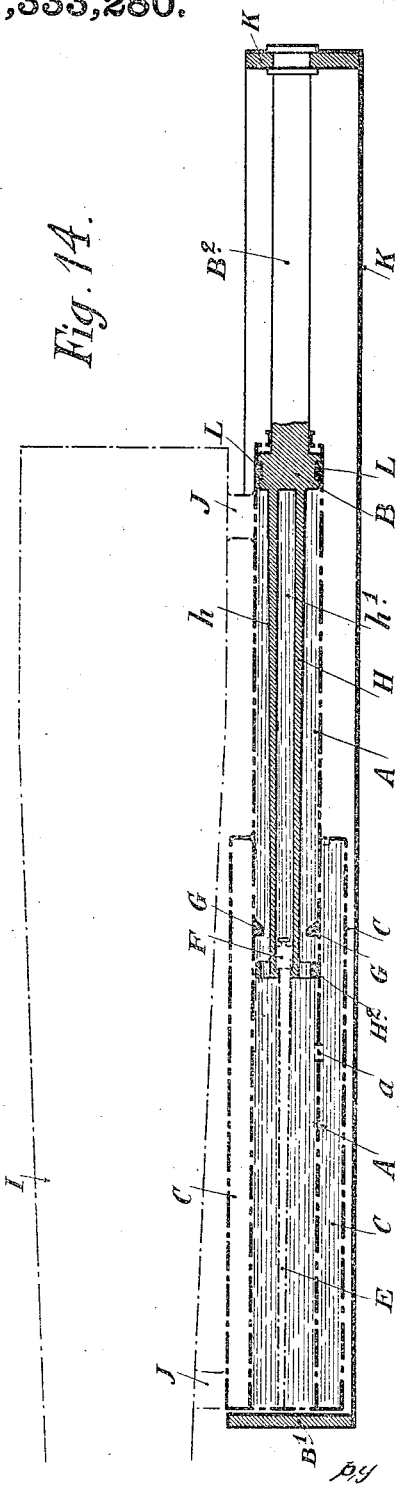
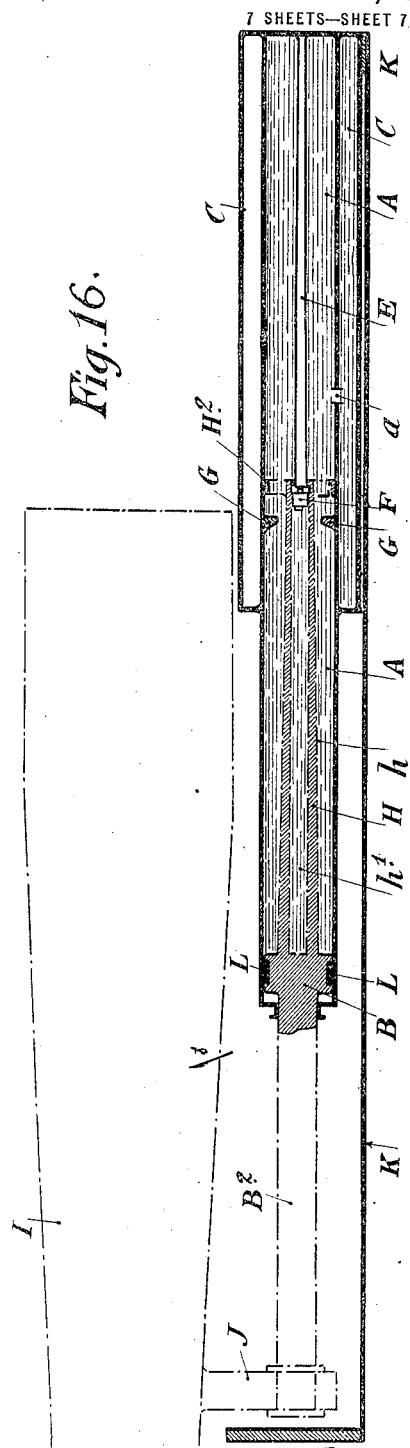

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

COMBINED APPARATUS COMPRISING A RECOIL-BRAKE, A RECUPERATOR, AND A RUNNING-OUT MODERATOR FOR GUNS.

1,333,280.               Specification of Letters Patent.      Patented Mar. 9, 1920.

Application filed September 10, 1918. Serial No. 253,457.

*To all whom it may concern:*

Be it known that I, EUGÈNE SCHNEIDER, a citizen of the French Republic, and a resident of 42 Rue d'Anjou, Paris, France, have invented a new and useful Improvement in Improved Combined Apparatus Comprising a Recoil-Brake, a Recuperator, and a Running-Out Moderator for Guns, which invention is fully set forth in the following specification.

This invention relates to recoil mechanism for guns, and it has for its object to provide an improved apparatus comprising a combined recoil brake, recuperator and running-out governor for guns which possesses the advantage of having only one working joint to be kept fluid-tight.

Heretofore, the usual apparatus of this type has comprised a recoil brake cylinder fixed, for instance, to the recoiling part, that is to say, to the gun barrel or its slide, a recuperator cylinder communicating through a passage with a reservoir containing air or gas under pressure above the free surface of the liquid, and a recoil brake piston and a recuperator piston in the respective cylinders and having piston rods attached to a fixed part of the gun, for instance to the cradle. In this known arrangement the braking action is effected by throttling the flow of the liquid between the inner surface of a diaphragm formed on the recoil brake piston and the outer surface of a counter-rod fixed to the rear end of the recoil brake cylinder, the cross sections of which counter-rod vary according to a determined law. A running-out governor is provided by the hollow rod of the recoil brake piston and a valve movably mounted on the inner end of said counter-rod.

This known arrangement contains, as will be readily seen, three working joints which have to be kept tight. A first liquid-tight joint has to be formed between the recuperator piston and the walls of the recuperator cylinder, while two other liquid-tight working joints must be formed between the recuperator piston rod and the front end of the recuperator cylinder and between the recoil-brake piston rod and the front end of the recoil-brake cylinder.

According to the present invention the whole apparatus, comprising the recoil brake, the recuperator and the governor, is arranged and constructed in such a manner as to comprise only one liquid-tight working joint. For this purpose the apparatus comprises two elements that are fixed respectively to the fixed part and the recoiling part of the gun, one of them constituting a pump barrel and the other a plunger for the latter. One of these elements, namely, the pump barrel or the plunger, carries internally, so as to project respectively from its lateral wall and its end wall, a recoil brake diaphragm and a counter-rod carrying the governor valve. The other element, namely, the plunger or the pump barrel, carries projecting from its internal surface a tubular counter-rod of predetermined profile externally. In the movements toward and away from each other of these two elements, one of which is fixed to the fixed part and the other of which is fixed to the recoiling part, the tubular counter-rod of the second element moves inside the diaphragm of the first element, while at the same time it moves over the valve-carrying counter-rod which is carried by said first element and may also have a varying external profile.

The invention is capable of receiving a variety of mechanical expressions, several of which are shown on the accompanying drawings, but it is to be expressly understood that the drawings are for purpose of illustration only, and are not to be construed as a definition of the limits of the invention, reference being had to the appended claims for that purpose.

In said drawings:

Fig. 3 is a cross section on the line III—III of Fig. 2.

Fig. 4 is a partial longitudinal section corresponding to Fig. 1, but drawn to a larger scale and showing more particularly the arrangement of the single working joint contained in the improved combined recoil brake, recuperator and running-out governor.

Fig. 5 is a similar enlarged section corresponding to Fig. 2.

Fig. 6 is a longitudinal section of a modified form of the preceding construction, showing the gun in run-out position.

Fig. 7 is a cross-section thereof.

Figs. 8 and 9 represent in longitudinal and cross section a further modified embodiment of the invention.

Figs. 10 and 11 represent in longitudinal and cross section another embodiment thereof.

Figs. 12 and 13 represent in longitudinal and cross section still another embodiment.

Figs. 14 and 15 represent in longitudinal and cross section a modification of the preceding construction.

Figs. 16 and 17 represent in longitudinal and cross section a modification of the construction shown in Figs. 14 and 15.

Figure 1:
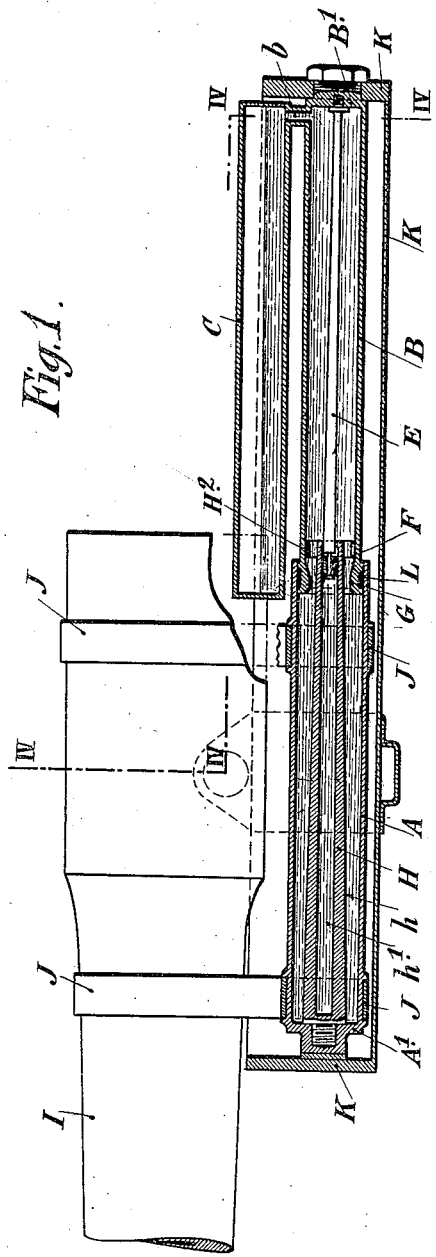
Figure 1 is a longitudinal sectional elevation illustrating one practical embodiment of the invention, the parts being shown in the run-out position of the gun.
Figure 2:
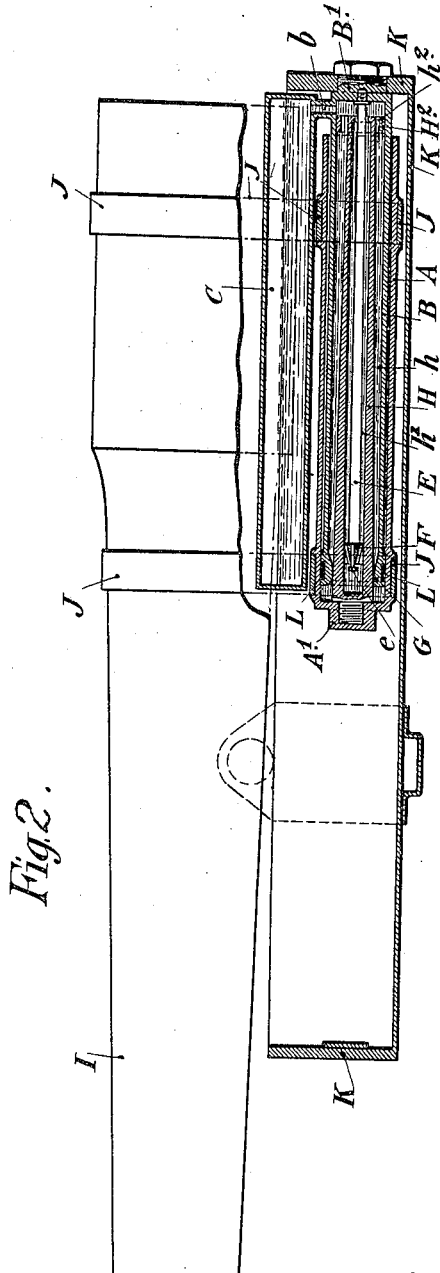
Fig. 2 is a similar view, the parts being shown in the position they occupy at the end of the recoil.

In Figs. 1 to 5, A is the element constituting the pump barrel; it is assumed to be carried by a recoiling part, for instance the gun barrel I, by means of straps J. B is a cylinder forming a piston or plunger for the said pump barrel. The plunger B is assumed in this example to be carried by a fixed part, such as the gun cradle K. The gas reservoirs C are likewise shown attached to this fixed part and in communication with the cylinder B by means of passages $b$ provided near the rear end of the cylinder B and the reservoirs. The brake diaphragm G is formed near the inner end of the cylinder B, projecting from the inner surface of the latter. The outer end $A^1$ of the cylinder A has projecting interiorly from its center a tubular rod H open at its free end and extending slightly beyond the brake diaphragm G. The exterior diameter of the rod H varies progressively according to the braking law which it is desired to carry into effect. The outer end $B^1$ of the cylinder B carries, projecting interiorly and from its center, a counter-rod E provided at its free end with a valve F shown as movable thereon and which, when the gun is run out, enters the end of the cavity $h^1$ of the rod H.

The whole apparatus thus constituted contains only one working joint L which is formed around the inner end of the plunger B, between said end and the inside surface of the pump barrel A.

In the recoil, the cylinder A slides over the cylinder B, the liquid being forced toward the reservoirs C by the mutual approach of the ends $A^1$ and $B^1$ while the two cylinders are telescoping one within the other. The braking action during the recoil is due to the throttling of the flow of the liquid between the outer surface $h$ of the rod H and the walls of the orifice in the diaphragm G.

The braking action during the running-out movement of the gun is due to the displacement of the profiled counter-rod E inside the tubular rod H. From the very beginning of the running-out movement, the valve F, which during the recoil of the gun was in the position shown in Fig. 5, is pressed by the recuperator pressure against the head $e$; now, since it has become impossible for the liquid to flow toward the inner end of the cavity $h^1$, the liquid, forced back by the counter-rod E into the main portion of the cavity $h^1$, will flow toward the cylinder B passing through the orifice of varying section remaining between the counter-rod E and the inlet of the tubular rod H.

The free end of this tubular rod H may of course be provided, as shown, on the one hand with an affixed diaphragm $H^1$, and on the other hand with a guide ring $H^2$ connected to the body of the rod by ribs $h^2$.

In the modification of Figs. 6 and 7, the reservoirs C are fixed to the cylinder A and to the movable part I; the cylinder B formed as a plunger being carried by the fixed part as in the preceding example. Communication between the cylinder A and the reservoirs is established through passages $a$ near the outer end $A^1$. In these and the following figures, the moving part A is indicated, for the sake of clearness, in dot and dash lines, while the fixed part is shown in full lines. The operation is exactly the same as in the preceding example. The entire apparatus contains only one working joint L.

Figure 8:
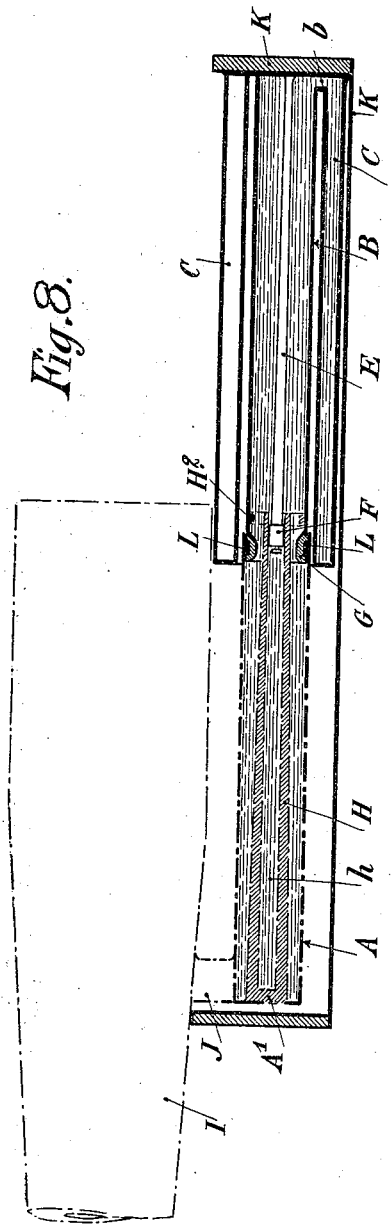

In Figs. 8 and 9, a single compressed air or gas reservoir C is arranged around the cylinder B that serves as a plunger carried by the fixed part K. A passage $b$, establishing communication with the said reservoir, is provided at the rear end of the said cylinder. Obviously, the annular free space between the reservoir C and the cylinder B should be of suitable nature so not to interfere in any way with the movements of the cylinder A.

Figure 10:
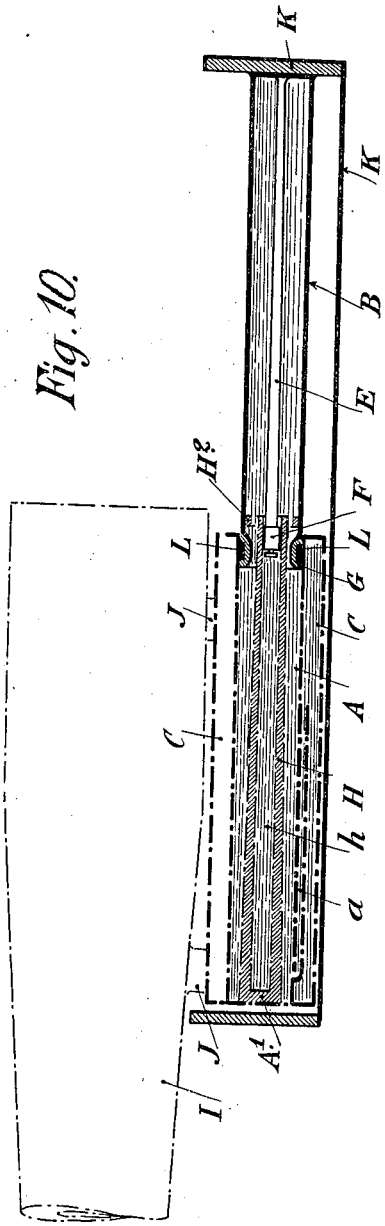

In Figs. 10 and 11, an annular reservoir C is formed around the cylinder A that is fixed to the moving part. In order that the communication between the cylinder A and the reservoir shall not cease to be covered by the liquid when the gun is aimed at high angles of elevation, it is advisable to provide the said communication by means of an attached conduit $a$ formed on the outside of the cylinder A and opening at a point toward the rear which is covered with liquid in all positions.

In Figs. 12 and 13, a pump barrel A, communicating at suitable points $a$, $a$, with the reservoir C, carries, projecting from its end, the valved counter-rod E—F of the running-out governor. The diaphragm G projects interiorly at an intermediate point of the wall of this pump barrel. Said pump barrel is adapted to move over the plunger $B^3$ carrying, projecting interiorly from its center, a tubular rod H which is profiled externally and into the tubular cavity of which there projects the end of the counter-rod E carried by the outer end $A^1$ of the pump barrel A. The plunger $B^3$ is connected to the fixed part K by a strong rod $B^2$ on which the open end of the cylinder A may be guided. A single working joint L is formed between the outer side of the plunger $B^3$ and the inside surface of the cylinder A. Communication between the cylinder A and the reservoirs C may be established by means of a number of orifices $a$ in such a manner as to provide, in the forcing stroke, a sufficient area of opening in order to allow of the flow taking place without additional braking action.

In Figs. 14 and 15, the construction differs from the preceding example only in that it comprises a single compressed air or gas reservoir arranged annularly around the pump barrel A. Communication between the cylinder A and the reservoir C is effected by means of an orifice $a$ situated at a suitable point toward the rear where it will always be covered with liquid.

In Figs. 16 and 17, the whole of the pump barrel A and the reservoir C is carried by the fixed part, whereas the plunger $B^3$ carrying the profiled tubular rod H, is carried by the moving part, that is to say, the gun barrel I.

While the illustrated embodiments have been described with considerable particularity it is to be expressly understood that the invention is not to be restricted thereto, as the same is capable of receiving a variety of mechanical expressions, some of which will readily suggest themselves to those skilled in the art. Therefore, reference is to be had to the claims hereto appended for a definition of the limits of the invention.

What is claimed is:

1. A combined recoil brake, recuperator and running-out governor comprising an element fixed to a fixed part of the gun, an element fixed to a recoiling part of the gun, said elements together constituting the pump barrel and plunger of a fluid-pressure recuperator and being so connected to said gun parts that the closed end of the pump barrel and the plunger relatively approach during the recoil of the gun, a brake diaphragm and a valved counter-rod carried by one of said elements and a tubular counter-rod carried by the other of said elements and coacting with said brake diaphragm and said valved counter-rod.

2. A combined recoil brake, recuperator and running out governor comprising an element fixed to a fixed part of the gun, an element fixed to a recoiling part of the gun, said elements together constituting the pump barrel and plunger of a fluid-pressure recuperator and being so connected to said gun parts that the closed end of the pump barrel and the plunger relatively approach during the recoil of the gun, a brake diaphragm projecting inwardly from the lateral wall and a valved counter-rod projecting axially from the end wall of one of said elements, and a tubular counter-rod projecting axially from the end wall of the other of said elements and coacting with said brake diaphragm and said valved counter-rod.

3. A combined recoil brake, recuperator and running-out governor for a gun comprising two elements fixed respectively to a fixed part and a recoiling part of said gun, one of said elements constituting a pump barrel and the other of said elements constituting a plunger of a fluid-pressure recuperator, a brake diaphragm and a counter-rod carried by one of said elements, and a tubular counter-rod of varying cross-section carried by the other of said elements and adapted to coact with said brake diaphragm and said first-named counter-rod.

4. In a combined recoil brake, recuperator and running-out governor for a gun, two elements fixed respectively to a fixed part and a recoiling part of said gun, one of said elements constituting a pump barrel and the other of said elements constituting a plunger, a brake diaphragm and a counter-rod carried by one of said elements, a tubular counter-rod carried by the other of said elements and adapted to coact with said brake diaphragm and said first-named counter-rod, and a compressed air or gas reservoir surrounding one of said elements.

5. In a combined recoil brake, recuperator and running-out governor for a gun, two elements fixed respectively to a fixed part and a recoiling part of said gun, one of said elements constituting a pump barrel and the other of said elements constituting a plunger, a brake diaphragm and a counter-rod carried by one of said elements, a tubular counter-rod carried by the other of said elements and adapted to coact with said brake diaphragm and said first-named counter-rod, and a compressed-air or gas reservoir carried by the element fixed to the recoiling part of the gun and in communication with said element at a point spaced from the forward end thereof.

6. In a combined recoil brake, recuperator and running-out governor for a gun, two elements fixed respectively to a fixed part and a recoiling part of the gun, one of said elements comprising a cylinder and counter-rod, the other of said elements comprising a tubular counter-rod adapted to move telescopically with respect to said cylinder and first-named counter-rod, and a compressed-air or gas reservoir in communication with the interior of one of said elements and surrounding the same.

7. A combined recoil brake, recuperator and running-out governor for a gun, comprising a brake-cylinder having a closed end and an open end, a piston therein having a tubular extension in communication with the brake-cylinder, a compressed air reservoir for receiving brake fluid displaced by the approach of the piston and closed end of said brake cylinder during recoil, a tubular counter-rod having a tapering exterior carried by one of said brake elements and coöperating with the other brake element to control displacement of brake fluid into said reservoir during recoil and a valved counter-rod carried by the other brake element and having a tapering stem adapted to enter said tubular counter-rod during recoil and to control brake action during return of the gun to battery.

8. A combined recoil brake, recuperator and running-out governor for a gun, comprising a brake-cylinder having a closed end and an open end, a piston therein having a tubular extension in communication with the brake cylinder, a compressed air reservoir for receiving brake fluid displaced by telescopically collapsing said brake elements during recoil, and means carried by said elements for controlling brake action during the collapsing and extension of said elements.

9. A combined recoil brake, recuperator and running-out governor for a gun, comprising a brake-cylinder having a closed end and an open end, a piston therein having a tubular extension in communication with the brake-cylinder, a compressed air reservoir surrounding one of said brake elements and in communication therewith for receiving brake-fluid displaced by the approach of the piston and closed end of said cylinder during recoil, a tubular counter-rod carried by one of said brake elements and coöperating with the other brake element to control braking action during recoil, and a valved counter-rod carried by the other brake element and coöperating with said tubular counter rod to control braking action during return of the gun to battery.

10. A combined recoil brake, recuperator and running-out governor for a gun, comprising a brake-cylinder having a closed end and an open end and fast to a recoiling part of the gun, a piston therein having a tubular extension in communication with the brake-cylinder and fast to a fixed part of the gun, a compressed air reservoir surrounding one of said brake elements and in communication therewith for receiving brake fluid displaced by the approach of the piston and closed end of said cylinder during recoil, a tubular counter-rod carried by the brake cylinder coöperating with a part of said tubular piston extension to control brake action during recoil, and a valved rod carried by said extension coöperating with said tubular counter-rod to control brake action during return to battery.

In testimony whereof I have signed this specification.

EUGÈNE SCHNEIDER.

Witnesses:
ANDRE NOSTICKER,
JOHN F. SIMONS.